A. E. SANDER.
CASTER.
APPLICATION FILED MAY 27, 1912.

1,046,027.

Patented Dec. 3, 1912.

WITNESSES

INVENTOR
Arthur E. Sander
BY
ATTORNEY

UNITED STATES PATENT OFFICE.

ARTHUR E. SANDER, OF CHICAGO, ILLINOIS.

CASTER.

1,046,027.  Specification of Letters Patent.  Patented Dec. 3, 1912.

Application filed May 27, 1912.  Serial No. 699,911.

*To all whom it may concern:*

Be it known that I, ARTHUR E. SANDER, a subject of the German Emperor, residing at Chicago, in the county of Cook and State of Illinois, have invented new and useful Improvements in Casters, of which the following is a specification.

This invention relates to improvements in casters and particularly to improvements in casters for the legs of chairs.

An object of the invention is to provide a caster, preferably of sheet metal, which may more easily be attached to the legs of chairs than casters used up to the present time, on account of the smooth inner surface of the shank.

Another object of the invention is to provide a caster, having a shank of tubular or conical form, and provided with a seam, the longitudinal edges of the seam being interlocked by means which do not project beyond the surface of the shank.

With the foregoing and other objects in view, the invention consists of the novel construction, combination and arrangement of parts hereinafter referred to and illustrated in the accompanying drawing.

Figure 2:
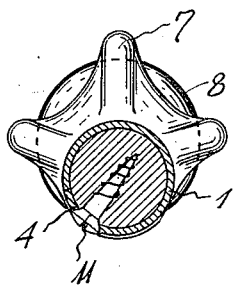
Figure 1:
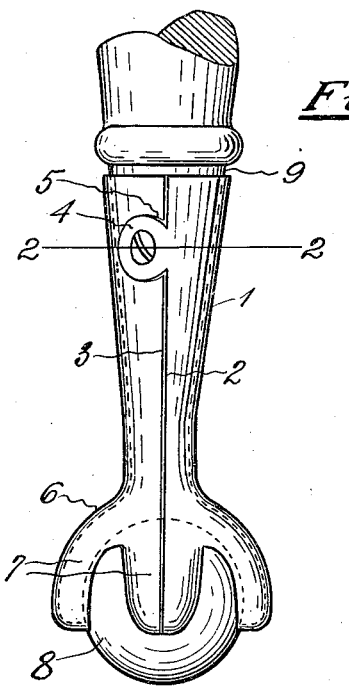

In the drawing: Figure 1 is an elevational view of a caster attached to the lower part of the leg of a chair or such like, and Fig. 2 is a horizontal section on line 2—2 of Fig. 1.

The caster, shown by way of example preferably is made of sheet metal, so that the shank portion 1 thereof is provided with walls of uniform thickness on the entire length. By making this device of sheet metal the attachment of the caster to the shank portion of the leg is facilitated, as the inner surface of the caster shank is very smooth. In the embodiment of the invention illustrated in Fig. 1 the shank is hollow and of conical shape, tapering toward the lower part thereof. The shank 1 may be made by bending, rolling or pressing it from a blank and the seam edges 2 and 3 of the shank are shown in such close juxtaposition that they abut against each other. For the purpose of maintaining the wall portions of the shank adjacent the seam in their proper position, locking means are provided. The locking means shown comprise a tongue 4 projecting from the longitudinal edge 2 into a recess 5 of suitable shape which opens into the other longitudinal edge 3. Although one tongue is only shown in the drawing it is obvious that a plurality of the same may be provided and a corresponding number of recesses may serve to receive the projecting portions or tongues. To increase the holding power of these interlocking means for abutting wall portions of the caster, the projecting elements and recesses respectively are formed so as to be in mutual dovetailing engagement; in the embodiment illustrated the projecting tongue 4 is of substantially circular form, while the circumference of the recess is arcuate, whereby an interlocking engagement between the two wall portions of the caster is effected.

The shank of the caster may be connected or may be formed integral with a socket 6 having a plurality of claws 7 which are adapted to firmly grasp a ball 8 or other supporting means therein. In the caster shown the seam edges 2 and 3 extend longitudinally with respect to the entire ball support.

The shank portion 9 of the leg is firmly driven into the shank portion 1 of the caster and is secured therein by means of a screw 11 or such like, which in the embodiment shown projects through the locking means for the wall portions of the caster.

While I have shown a single embodiment of the invention, I do not desire to be limited to the particular form illustrated or described; many variations in the shape or in the arrangements of the interlocking means deviating from the form illustrated may be made within the scope of the claim.

I claim—

Caster made of sheet metal, comprising a tapering shank, a socket at the narrow end of the shank and integral therewith; a ball rigidly held in said socket, said socket comprising a plurality of claws, the shank having abutting longitudinal edges, one of said edges being provided with a projection, the other edge having a recess, the projection of one side of the shank being held in locking engagement in said recess.

Signed at Chicago this 24th day of May, 1912 in the presence of two witnesses.

ARTHUR E. SANDER.

Witnesses:
CARL O. STERN,
MAMIE STUECK.